United States Patent
Ramchandani et al.

(10) Patent No.: US 11,182,661 B2
(45) Date of Patent: Nov. 23, 2021

(54) READER NETWORK SYSTEM FOR PRESENCE MANAGEMENT IN A PHYSICAL RETAIL ENVIRONMENT

(75) Inventors: Jayant Ramchandani, Fremont, CA (US); John Rolin, Morgan Hill, CA (US)

(73) Assignee: Maplebear Inc., San Francisco, CA (US)

( * ) Notice: Subject to any disclaimer, the term of this patent is extended or adjusted under 35 U.S.C. 154(b) by 993 days.

(21) Appl. No.: 13/344,419

(22) Filed: Jan. 5, 2012

(65) Prior Publication Data

US 2012/0316953 A1 Dec. 13, 2012

Related U.S. Application Data

(60) Provisional application No. 61/430,450, filed on Jan. 6, 2011, provisional application No. 61/430,447, filed on Jan. 6, 2011, provisional application No. 61/430,451, filed on Jan. 6, 2011.

(51) Int. Cl.
*G06Q 30/02* (2012.01)
*G06K 19/07* (2006.01)
(Continued)

(52) U.S. Cl.
CPC ... *G06K 19/0723* (2013.01); *G06K 19/07749* (2013.01); *G06Q 20/341* (2013.01);
(Continued)

(58) Field of Classification Search
CPC .................................. G06Q 30/00–30/0284
(Continued)

(56) References Cited

U.S. PATENT DOCUMENTS

| 4,614,861 A | 9/1986 | Pavlov et al. |
|---|---|---|
| 4,634,845 A | 1/1987 | Hale et al. |

(Continued)

FOREIGN PATENT DOCUMENTS

| EP | 1189462 | 3/2002 |
|---|---|---|
| EP | 1189462 A1 | 3/2002 |

(Continued)

OTHER PUBLICATIONS

Ala-Kortesniemi, Radio Frequency Identification (RFID) Technology in Marketing Communication, 2010, Bachelor Thesis for HAAGA-HELIA ammattikorkeakoulu, pp. 1-54 (Year: 2010).*

(Continued)

*Primary Examiner* — John Van Bramer
(74) *Attorney, Agent, or Firm* — Fenwick & West LLP

(57) ABSTRACT

A customer relationship management system wirelessly detects presence and identity of a customer when the customer enters a business establishment. The system captures a visit pattern of the customer based on communication from the wireless device. A relevant marketing message for the customer is determined based on the customer's presence, visit pattern, identity, and location. The marketing message is delivered directly to a wireless device carried to the customer upon a subsequent entry of the customer to the business establishment. Responses of the customer (e.g., purchasing patterns, etc.) are stored for subsequent use in presenting relevant offers.

20 Claims, 12 Drawing Sheets

(51) Int. Cl.

| | | |
|---|---|---|
| *G06Q 20/34* | (2012.01) | |
| *G07F 7/08* | (2006.01) | |
| *G06K 19/077* | (2006.01) | |
| *G06Q 20/38* | (2012.01) | |

(52) U.S. Cl.
CPC ......... *G06Q 20/352* (2013.01); *G06Q 20/387* (2013.01); *G06Q 30/0207* (2013.01); *G06Q 30/0224* (2013.01); *G06Q 30/0235* (2013.01); *G06Q 30/0241* (2013.01); *G06Q 30/0251* (2013.01); *G06Q 30/0261* (2013.01); *G06Q 30/0267* (2013.01); *G06Q 30/0269* (2013.01); *G06Q 30/0272* (2013.01); *G06Q 30/0281* (2013.01); *G07F 7/0833* (2013.01); *G07F 7/0846* (2013.01); *Y10T 29/49016* (2015.01)

(58) Field of Classification Search
USPC .............................................. 705/14.1–14.73
See application file for complete search history.

(56) References Cited

U.S. PATENT DOCUMENTS

| | | | |
|---|---|---|---|
| 4,667,087 A | 5/1987 | Quintana | |
| 4,924,075 A | 5/1990 | Tanaka | |
| 5,038,251 A | 8/1991 | Sugiyama et al. | |
| 5,072,380 A | 12/1991 | Randelman et al. | |
| 5,170,046 A | 12/1992 | Kusakabe | |
| 5,295,064 A | 3/1994 | Malec et al. | |
| 5,317,330 A | 5/1994 | Everett et al. | |
| 5,539,395 A | 7/1996 | Buss et al. | |
| 5,569,903 A | 10/1996 | Matsubara | |
| 5,629,981 A | 5/1997 | Nerlikar | |
| 5,642,485 A | 6/1997 | Deaton et al. | |
| 5,649,114 A | 7/1997 | Deaton et al. | |
| 5,862,222 A | 1/1999 | Gunnarsson | |
| 5,870,030 A | 2/1999 | Deluca et al. | |
| 5,898,738 A | 4/1999 | Nagata et al. | |
| 5,955,021 A | 9/1999 | Tiffany, III | |
| 6,025,780 A | 2/2000 | Bowers et al. | |
| 6,116,505 A | 9/2000 | Withrow | |
| 6,282,516 B1 | 8/2001 | Giuliani | |
| 6,313,745 B1 | 11/2001 | Suzuki | |
| 6,317,718 B1 | 11/2001 | Fano | |
| 6,327,570 B1 | 12/2001 | Stevens | |
| 6,354,493 B1 | 3/2002 | Mon | |
| 6,360,208 B1 | 3/2002 | Ohanian et al. | |
| 6,370,513 B1 | 4/2002 | Kolawa et al. | |
| 6,487,180 B1 | 11/2002 | Borgstahl et al. | |
| 6,507,279 B2 | 1/2003 | Loof | |
| 6,509,829 B1 | 1/2003 | Tuttle | |
| 6,513,015 B2 | 1/2003 | Ogasawara | |
| 6,522,264 B1 | 2/2003 | Stewart | |
| 6,523,752 B2 | 2/2003 | Nishitani et al. | |
| 6,529,880 B1 | 3/2003 | McKeen et al. | |
| 6,546,257 B1 | 4/2003 | Stewart | |
| 6,546,374 B1 | 4/2003 | Esposito et al. | |
| 6,554,187 B2 | 4/2003 | Otto | |
| 6,587,835 B1* | 7/2003 | Treyz et al. | 705/14.64 |
| 6,600,418 B2 | 7/2003 | Francis et al. | |
| 6,611,206 B2 | 8/2003 | Eshelman et al. | |
| 6,657,543 B1 | 12/2003 | Chung | |
| 6,659,344 B2 | 12/2003 | Otto et al. | |
| 6,671,358 B1 | 12/2003 | Seidman et al. | |
| 6,677,858 B1 | 1/2004 | Faris et al. | |
| 6,813,609 B2 | 11/2004 | Wilson | |
| 7,006,982 B2 | 2/2006 | Sorensen | |
| 7,010,501 B1 | 3/2006 | Roslak et al. | |
| 7,079,571 B1 | 7/2006 | Chen | |
| 7,619,522 B2 | 11/2009 | Geissler | |
| 7,886,981 B2 | 2/2011 | Morita | |
| 7,932,813 B2 | 4/2011 | O'Byrne et al. | |
| 7,962,361 B2 | 6/2011 | Ramchandani et al. | |
| 7,965,188 B2 | 6/2011 | Geissler | |
| 8,054,160 B2 | 11/2011 | Corrado et al. | |
| 8,073,460 B1* | 12/2011 | Scofield | H04M 3/4878 455/456.1 |
| 8,229,787 B2 | 7/2012 | Ramchandani et al. | |
| 8,274,372 B2 | 9/2012 | Fujino | |
| 8,471,685 B2 | 6/2013 | Shingai | |
| 2001/0027439 A1 | 10/2001 | Holtzman et al. | |
| 2001/0049636 A1 | 12/2001 | Hudda et al. | |
| 2002/0011519 A1 | 1/2002 | Shults, III | |
| 2002/0016740 A1 | 2/2002 | Ogasawara | |
| 2002/0038267 A1 | 3/2002 | Can et al. | |
| 2002/0065680 A1 | 5/2002 | Kojima et al. | |
| 2002/0077883 A1 | 6/2002 | Lancos et al. | |
| 2002/0077930 A1 | 6/2002 | Trubey et al. | |
| 2002/0082559 A1 | 6/2002 | Chang et al. | |
| 2002/0082589 A1 | 6/2002 | Lancos et al. | |
| 2002/0082992 A1 | 6/2002 | Ritter | |
| 2002/0116209 A1 | 8/2002 | Tsuge | |
| 2002/0116266 A1 | 8/2002 | Marshall | |
| 2002/0117544 A1 | 8/2002 | Wolf et al. | |
| 2002/0129063 A1 | 9/2002 | Kosak et al. | |
| 2002/0138432 A1 | 9/2002 | Makino et al. | |
| 2002/0147642 A1 | 10/2002 | Avallone et al. | |
| 2002/0165758 A1 | 11/2002 | Hind et al. | |
| 2002/0169714 A1 | 11/2002 | Ike et al. | |
| 2002/0170961 A1 | 11/2002 | Dickson et al. | |
| 2002/0174025 A1 | 11/2002 | Hind et al. | |
| 2002/0186133 A1 | 12/2002 | Loof | |
| 2002/0194081 A1 | 12/2002 | Perkowski | |
| 2003/0001009 A1 | 1/2003 | Collins et al. | |
| 2003/0055667 A1 | 3/2003 | Sgambaro et al. | |
| 2003/0097302 A1 | 5/2003 | Overhultz et al. | |
| 2003/0097441 A1 | 5/2003 | Konomi | |
| 2003/0125929 A1 | 7/2003 | Bergstraesser et al. | |
| 2003/0150908 A1 | 8/2003 | Pokorny et al. | |
| 2003/0150909 A1 | 8/2003 | Markham et al. | |
| 2003/0154144 A1 | 8/2003 | Pokorny et al. | |
| 2003/0155415 A1 | 8/2003 | Markham et al. | |
| 2003/0158795 A1 | 8/2003 | Markham et al. | |
| 2003/0171956 A1 | 9/2003 | Cox et al. | |
| 2003/0174099 A1 | 9/2003 | Bauer et al. | |
| 2003/0177025 A1 | 9/2003 | Curkendall et al. | |
| 2003/0195812 A1 | 10/2003 | Nguyen | |
| 2004/0029569 A1 | 2/2004 | Khan et al. | |
| 2004/0036623 A1 | 2/2004 | Chung | |
| 2004/0044575 A1 | 3/2004 | Bakker et al. | |
| 2004/0093268 A1 | 5/2004 | Ramchandani et al. | |
| 2004/0153368 A1 | 8/2004 | Freishtat et al. | |
| 2005/0156711 A1 | 7/2005 | Aljadeff et al. | |
| 2005/0237160 A1 | 10/2005 | Nolan et al. | |
| 2006/0000900 A1 | 1/2006 | Fernandes | |
| 2006/0114109 A1 | 6/2006 | Geissler | |
| 2006/0149628 A1* | 7/2006 | Chefalas | G06Q 30/0234 705/14.18 |
| 2007/0013481 A1 | 1/2007 | Zhu et al. | |
| 2007/0013523 A1 | 1/2007 | Paradiso et al. | |
| 2007/0027762 A1* | 2/2007 | Collins et al. | 705/14 |
| 2007/0121843 A1* | 5/2007 | Atazky | G06Q 30/0269 379/114.13 |
| 2007/0194935 A1 | 8/2007 | Ayala et al. | |
| 2008/0042850 A1* | 2/2008 | De Witte | G06K 19/0724 340/572.7 |
| 2008/0067526 A1 | 3/2008 | Chew | |
| 2008/0201264 A1 | 8/2008 | Brown et al. | |
| 2008/0204194 A1 | 8/2008 | Haar et al. | |
| 2008/0228600 A1* | 9/2008 | Treyz | H04W 4/24 705/26.43 |
| 2008/0266103 A1 | 10/2008 | Chen et al. | |
| 2008/0272892 A1 | 11/2008 | O'Byrne et al. | |
| 2009/0045251 A1 | 2/2009 | Jaiswal et al. | |
| 2009/0058614 A1 | 3/2009 | Roz | |
| 2009/0159701 A1 | 6/2009 | Mullen et al. | |
| 2009/0159708 A1 | 6/2009 | Mullen et al. | |
| 2009/0159713 A1 | 6/2009 | Mullen et al. | |
| 2009/0255996 A1 | 10/2009 | Brown et al. | |
| 2009/0286553 A1* | 11/2009 | Northway | H04W 4/021 455/456.3 |
| 2009/0290520 A1 | 11/2009 | Roberts et al. | |
| 2009/0309736 A1 | 12/2009 | Heurtier | |
| 2010/0045468 A1 | 2/2010 | Geissler | |

(56) References Cited

U.S. PATENT DOCUMENTS

| | | | |
|---|---|---|---|
| 2010/0056097 A1 | 3/2010 | Liebman | |
| 2010/0141396 A1 | 6/2010 | Fujino | |
| 2010/0262449 A1* | 10/2010 | Monteforte | H04W 4/20 705/7.34 |
| 2011/0115685 A1 | 5/2011 | Chang | |
| 2011/0128129 A1 | 6/2011 | Graczyk et al. | |
| 2011/0295415 A1 | 12/2011 | Bartlett et al. | |
| 2012/0095805 A1* | 4/2012 | Ghosh | G06Q 30/0205 705/7.34 |
| 2012/0166836 A1 | 6/2012 | Hardman et al. | |
| 2012/0265622 A1 | 10/2012 | Ramchandani | |
| 2012/0280046 A1 | 11/2012 | Muirhead | |
| 2012/0313758 A1 | 12/2012 | Savarese et al. | |
| 2013/0119135 A1 | 5/2013 | Gauthier et al. | |
| 2013/0275217 A1 | 10/2013 | Ramchandani | |
| 2014/0156380 A1 | 6/2014 | Ramchandani | |

FOREIGN PATENT DOCUMENTS

| | | |
|---|---|---|
| WO | WO 1997/23838 | 7/1997 |
| WO | WO 1997/24689 | 7/1997 |
| WO | WO 2001-071582 | 9/2001 |
| WO | WO 02/21424 A2 | 3/2002 |
| WO | WO 2002-056212 | 7/2002 |
| WO | WO 2002-097699 | 12/2002 |
| WO | WO 2004-044688 | 5/2004 |

OTHER PUBLICATIONS

Non-Final Office Action for U.S. Appl. No. 10/290,008, dated Nov. 15, 2007.
Final Office Action for U.S. Appl. No. 10/290,008, dated May 29, 2008.
Advisory Action for U.S. Appl. No. 10/290,008, dated Sep. 5, 2008.
Non-Final Office Action for U.S. Appl. No. 10/290,008, dated Jan. 9, 2009.
Final Office Action for U.S. Appl. No. 10/290,008, dated Dec. 1, 2009.
Notice of Allowance for U.S. Appl. No. 10/290,008, dated Feb. 7, 2011.
International Search Report for International Application PCT/US2003/35384, dated Feb. 21, 2004.
Non-Final Office Action for U.S. Appl. No. 10/352,750, dated Oct. 2, 2009.
Final Office Action for U.S. Appl. No. 10/352,750, dated Jul. 23, 2010.
Non-Final Office Action for U.S. Appl. No. 10/352,750, dated Mar. 13, 2013.
Advisory Action for U.S. Appl. No. 10/352,750, dated Jul. 31, 2013.
Non-Final Office Action for U.S. Appl. No. 13/101,932, dated Dec. 9, 2011.
Notice of Allowance for U.S. Appl. No. 13/101,932, dated Mar. 23, 2012.
Non-Final Office Action for U.S. Appl. No. 13/530,967, dated Aug. 24, 2012.
Notice of Allowance for U.S. Appl. No. 13/530,967, dated Mar. 20, 2013.
Non-Final Office Action for U.S. Appl. No. 13/919,724, dated Jan. 2, 2014.
Advisory Action for U.S. Appl. No. 13/919,724, dated May 12, 2014.
Non-Final Office Action for U.S. Appl. No. 13/919,724, dated Oct. 7, 2014.
Final Office Action for U.S. Appl. No. 13/919,724, dated Feb. 9, 2015.

* cited by examiner

READER NETWORK SYSTEM FOR PRESENCE MANAGEMENT IN A PHYSICAL RETAIL ENVIRONMENT

RELATED APPLICATIONS

This application claims the benefit of U.S. Provisional Application No. 61/430,447 entitled "Reader Network System for Implementing Presence Management in a Physical Retail Environment" to Rolin, et al., filed Jan. 6, 2011, U.S. Provisional Application No. 61/430,450, entitled "PCB Design and Card Assembly for an Active RFID Tag in Credit Card Form Factor" to Rolin, et al., filed Jan. 6, 2011, and U.S. Provisional Application No. 61/430,451, entitled "Power Management for an Active RFID Tag in Credit Card Form Factor," to Rolin, et al., filed Jan. 6, 2011, the contents of which are all incorporated by reference herein.

BACKGROUND

1. Field of Art

The invention generally relates to customer relationship management and more specifically to a customer relationship management in a physical retail environment.

2. Description of the Related Art

Modern society has created a plethora of ways to provide goods and services to customers. However, physical locations continue to be the predominant forums preferred by customers. Physical locations include brick and mortar establishments, i.e., those places a customer can physically go to purchase goods, receive services, etc. Whatever the type of business, be it retail stores, banks, restaurants, patio cafes, or any other type business, customers prefer to interact directly with the providers of the goods and services.

From a perspective of customer service at brick and mortar establishments, present systems lacks a mechanism to effectively service the customer based on his profile, preferences and transaction history, or at best these mechanisms are very ad-hoc and un-automated. Although basic incentive systems are commonly used, these incentives are very limited in their effectiveness because they are offered at the end of the transaction, which is too late. Furthermore, present brick and mortar locations lack the technology to track and service customers within the retail establishment.

SUMMARY

A customer relationship management system provides marketing directly to a customer of a business establishment via wireless devices. The presence and identity of the customer are wirelessly detected via a network of device readers installed in the business establishment upon the customer's entry to the business establishment based on wireless communication with a wireless device carried by the customer. A visit pattern of the customer to the business establishment is also captured based on the communication between the reader network and the customer's wireless device. A relevant marketing message for the customer is determined based on at least one of the presence, visit pattern, identity, and location of the customer. The marketing message is sent to the wireless device of the customer upon a subsequent entry of the customer to the business establishment. The customer's response to the marketing messages is stored.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
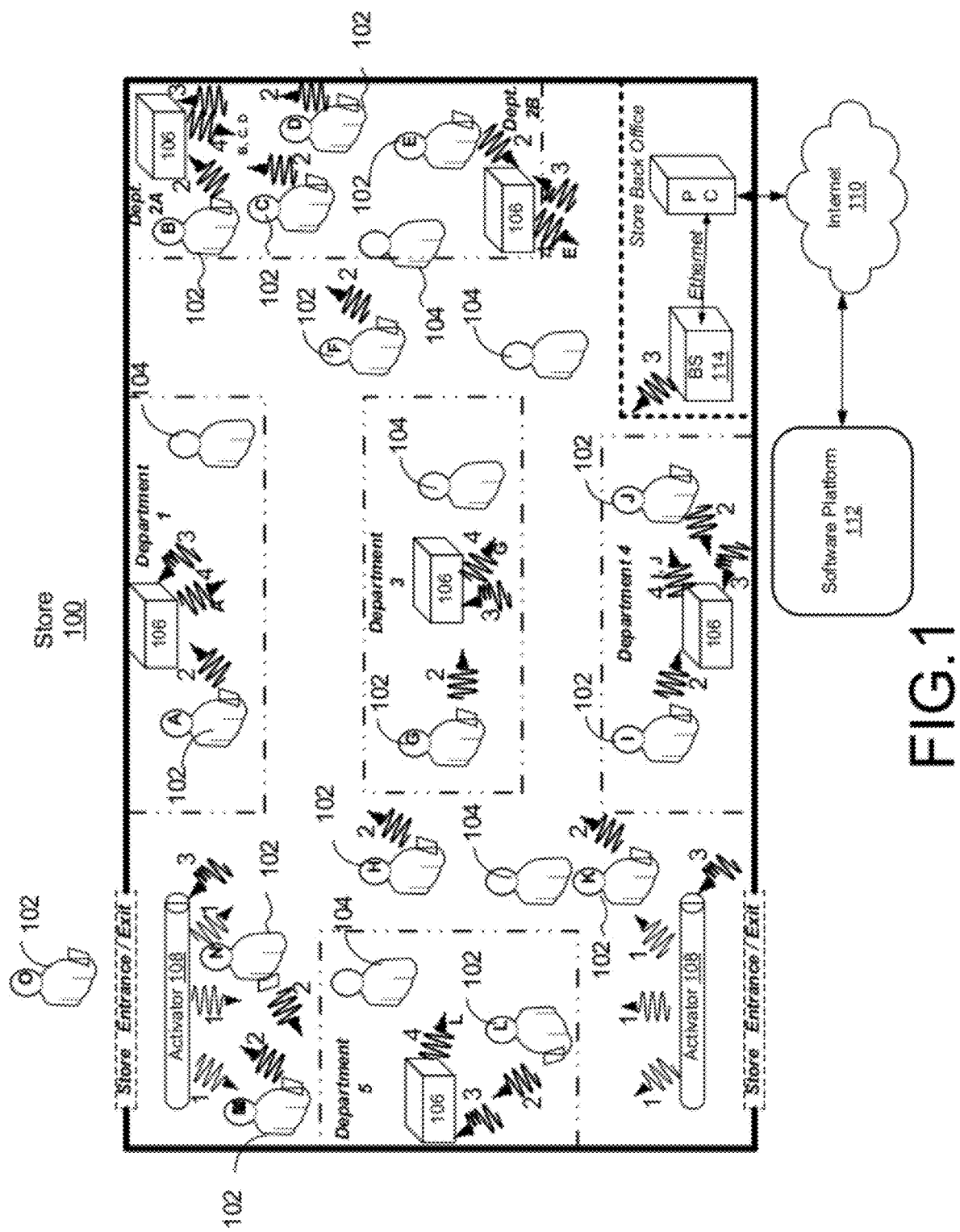
FIG. 1 is a block diagram of an In-Store Ad Network in accordance with one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A Digital In-Store Ad Network system can be used in retail environments to detect the localized presence of customers in real time. The Digital In-Store Ad Network uses this presence knowledge of customers to deliver relevant and timely offers to those customers while they are in the retail environment. This optimizes the customer's purchasing ability, increases store revenues, and increases customer loyalty. The Digital In-Store Ad Network collects and analyzes customer shopping pattern data and provides it to merchants and brand companies so they can easily optimize advertising effectiveness.

The Digital In-Store Ad Network comprises hardware and software platforms. The following description describes the hardware and operation of the Reader network installed in a store implementing the Digital In-Store Ad Network system.

TERMS & DESCRIPTIONS USED HEREIN

The following table (Table 1) provides example descriptions for terms used in the following sections. The table is intended to improve readability and clarity of the description of embodiments that follow. The terms below are not necessarily limited to the particular example definitions provided in table 1, but rather should be interpreted in view of the entire description (which may vary in between different described embodiments) and in view of their usage in the claims.

| Term | Description |
| --- | --- |
| 802.11 | The 802.11 family consists of a series of over-the-air modulation techniques that use the same basic protocol. The most popular are those defined by the 802.11b and 802.11g protocols, which are amendments to the original standard |
| Activation | Process of activating a Card (causes the Beacon State) |
| Activation Holdoff | Time period immediately following Beacon Mode expiration during which Card activation is disabled. |
| Activation Range | Maximum separation (distance) between an Activator and Card at which the Card will be successfully activated. |
| Activation Signal | RF transmission of an Activator used to turn on (activate) Cards. The activation signal contains data used by the Card to validate the activation signal and to set Card behavioral options. |
| Activation Zone | The physical volume within which a Card will be activated. Typically located at a Store or business entrance and/or exit. |
| Activator | Hardware device that wirelessly activates Cards upon arrival at an enabled retailer. |
| Active RFID Card | RFID card that uses an internal battery for enhanced performance |
| Anticollision | Method for avoiding or minimizing the collision of RF transmissions by more than one source occupying the same frequency and physical space so that each individual signal can be distinguished by a receiving device. |
| Base Station | Device that wirelessly receives Card read information from Readers and communicates this information to a host computer to facilitate the generation of offers to Customers through the Software Platform. |
| Beacon Mode | Operating state of a Card that commences upon activation. The Card periodically transmits a unique ID for detection by Reader hardware. |
| Bluetooth | A proprietary open wireless technology standard for exchanging data over short distances (using short wavelength radio transmissions in the ISM band from 2400-2480 MHz) from fixed and mobile devices |
| Brand Company | The branding manufacturer that sells products in stores (a.k.a. "Brand"). |
| Card | Hardware device carried by a person; contains electronics to practice the embodiments described. Generally has the form of a credit card. |
| Customer | Person (Consumer) who has opted into the Digital In-Store Ad Network and who possesses a Card. |
| Collision | Simultaneous RF transmissions by more than one source occupying the same frequency and physical space, which cause a receiving device to be unable to distinguish the individual signals. Also referred to as "data collision". |
| Consumer | Individual that shops and/or purchases products in a store (becomes a Customer upon opting-in to carry a Card). |
| Deep Sleep | Normal operating state of a Card in which power consumption is very low and the Card does not transmit information to Readers. |
| Demodulation | Process of separating a modulated signal into component signals, such as an RF signal ('carrier') and a data signal. |
| Digital In-Store Ad Network | hardware/software system used that provides relevant offers to participating Consumers while they are physically at a participating retail environment. |
| Hotspot | Small area in a store containing Reader(s) that detect Cards within that area. |
| ID | A numerical value assigned to and stored within each Card; the value being unique to each Customer. The ID Number is wirelessly transmitted by a Card when in the Beacon Mode for reception by Readers. Also referred to as "Card ID" or "ID number". |
| Listen | A state within the Sleep Mode during which the Card "listens" for activation signals. Cards can be activated only when in the Listen state. |
| Merchant | Business in which physical sales or services are provided to a consumer. Generally applies to businesses which have implemented the Digital In-Store Ad Network. Also referred to store, retailer, etc. |
| Modulation | Process of changing one signal as a function of another signal. Often used by transmitting devices to add information (data) onto an RF signal, thereby 'carrying' the data via electromagnetic wave to a remote receiving device for subsequent data extraction. |
| NFC | Near Field Communications a short-range wireless connectivity technology (based on ISO 14443 Type A and 14443 Type B standards and also on the NFC standard ISO 18092) that provides intuitive, simple, and safe communication between electronic devices. |

| Term | Description |
| --- | --- |
| RF | Radio frequency. |
| RF Signal | Radio frequency energy. May be modulated to carry information (data) to a receiving device. May refer to an electromagnetic wave propagating in space in wireless communication systems. |
| RF Transmission | Generation of an RF signal. Often used to cause electromagnetic wave propagation from an antenna through space in wireless communication systems. |
| RFID | Radio Frequency Identification |
| Read | The process or result of wirelessly detecting and successfully decoding a Card ID. |
| Reader | Hardware device that wirelessly receives Card IDs and relays this information to the Base Station. |
| Read Range | Maximum separation (distance) between RF transmitting and receiving devices (e.g., Card and Reader, respectively) at which the transmitted RF signal can be successfully read. |
| Read Zone | The area within which a hotspot Reader can reliably read activated Cards. |
| Read Volume | General term referring to read range in 3-dimensional space. Read range may vary with direction, device orientation, and presence of physical objects, so read volume is not necessarily uniform or symmetrical. |
| Retailer | See merchant |
| Session Metrics | Data that describes a Customer's shopping history within a participating retailer. This can include the time spent in the store, in each department, responses to ads, and purchases. |
| Store | See merchant |
| Wake-Up | The event of Card activation, which marks the transition from a low-power sleep state in the Card to a higher power activity state. |
| 6LoWPAN | A wireless networking standard for low power wireless personal area networks. |
| WAP | Wireless Access Point |

INTRODUCTION

FIG. 1 provides a high-level illustration of an embodiment of a Digital In-Store Ad Network. The Digital In-Store Ad Network is a hardware-software system that provides an integrated direct marketing solution that benefits participating product manufacturers, merchants, and consumers alike. Consumers benefit because they can receive private, relevant, and timely offers from product manufacturers and merchants while physically in the retail environment. Product manufacturers benefit by having an opportunity to market directly to consumers based upon interests they shared when opting-in to the system and enhanced with the consumer's shopping and purchasing history. Merchants benefit by better serving the needs of their customers, thereby improving customer loyalty and increasing sales. Revenue is collected from advertisers as a function of a) ads served, b) customer response to those ads, and c) offer redemption at the point of sale.

In a general embodiment, a reader network comprises of a network of any Wireless Transmitter/Reader devices (e.g., readers 106 and activators 108) which can communicate with a wireless device carried by a customer.

The Reader Network is able to detect the presence of the customer upon entry to the merchant's retail establishment (e.g., store 100) and also determine the location of the customer in specific sub-sections or departments of the business establishment. The Reader Network communicates the customer's identification information to a Software Platform 112.

The Software Platform 112 collects and analyzes store activity data of Customers 102 and then serves relevant offers to individual Customers 102 on their mobile phones while they are physically in a specific store 100. The Software Platform 112 can match offers to the specific department or product display that the Customer 102 is visiting at the time. The Software Platform 112 contains many functions, which include:

A configurable marketing campaign tool for advertisers and merchants.

A Rules Engine to convert in-store shopping metrics into knowledge services, which are used by advertisers and merchants analyze the effectiveness of offers so they can maximize revenues and customer loyalty.

A Customer portal for opting-in/out, entering or changing personal data, preferences, etc.

Hardware Building Blocks of Digital In-Store Ad Network System

In a general embodiment, a reader network comprises of a network of any Wireless Transmitter/Reader devices which can communicate with a wireless device carried by a customer. The Reader Network is able to detect the presence of the customer upon entry to the business establishment and also determine the location of the customer in specific sub-sections or departments of the business establishment.

When a Customer 102 opts-in to a sponsored program, their individual Wireless Device ID is associated with their account in the Software Platform 112. This information is known only to the Software Platform 112 and is used to facilitate the serving of offers to individual Customers 102 and for collecting shopping session metrics for participating brand companies and retailers. Other than their name and cellular telephone number, Customers 102 provide as much or as little additional information based upon the services they wish to receive and/or their individual disclosure preferences. Additional information, if provided, can include things such as product preferences, brand preferences, etc.; and can be used to provide even more relevant offers to Customers 102 while they are in a participating retail establishment.

The Software Platform 112 sends relevant offers are sent to a Customer's mobile phone, either as a text or SMS message. Offers sent to a Customer's mobile phone include product information and "coupon" codes that can be used for redemption at the point of sale The terms "store", "merchant", and "retailer" are used interchangeably in this description. These terms are not meant to limit the venue or business type in which the system can be used. Others include, but are not limited to, restaurants, entertainment, service businesses, etc.

Card-Based Presence Management

In one embodiment, consumers that opt-in are issued active RFID Cards, and become Customers. The Card contains an electronic system with antennae for wireless communication with hardware devices within an enabled store ("Store"). The Card also contains an internal battery that extends the wireless communication distance to meet the requirements of the application. The circuitry within the Card is permanently encoded with an ID number that is unique to each Card (there is no ID duplication amongst the Card and Customer population). The ID is an abstract number and no personally-identifiable Customer data resides on the Card. An important feature of the Card is its thin plastic credit card form factor, making it quite convenient and natural to carry. The Card can be produced with merchant-specific graphics so it can be offered as a loyalty card to its customers.

Another feature is that Customers only need to bring their Card with them when they shop at a Store. System hardware is designed such that the Card can be left in the Customer's wallet, purse, pocket, etc. —it does not have to be removed, manipulated, or presented in the store for the system to function properly. No special effort is required on the part of the Customer—they simply walk into the Store and shop in a normal manner.

An enabled Store 100 contains several distinct installed hardware devices, referred to as Activator 108, Reader 106, and Base Station 114. The basic function of each device and its role in the Digital In-Store Ad Network system is illustrated in FIG. 1 and described below. In general, the descriptions include the presence of at least one Card (i.e., Customer 102).

Activator

Activators 108 are typically located only at store entrances and/or egresses, so a Store 100 may have one or more Activators 108, depending upon the size and quantity of entrance and egress areas.

The Activator 108 wirelessly "turns on" (activates) a Customer's Card when they enter a Store 100, causing the Card to transmit its ID number via an RF (radio frequency) signal to receiving devices (Readers 106) distributed throughout the store.

The Activator 108 transmits a Card activation signal, which is a low frequency RF signal modulated with specific data; represented by arrow waves 1 pointing away from the Activator 108 in FIG. 1. A Card that receives and decodes the Activator signal 1 is triggered, or "activated", and begins to transmit its unique ID, which is represented by a arrow wave 2 pointing away from activated Cards. Activators 108 repeatedly transmit the activation signal 1 in order to trigger Cards entering the Store throughout the day. Activation signals 1 are typically transmitted in multiple directions, or axes, to assure reliable Card activation independent of Card orientation as they enter the Store 100 (though single-axis transmission is also possible). Once activated, Cards periodically transmit their IDs 2 for a finite period of time, and can therefore be read multiple times during the Customer's visit to the Store 100 without requiring re-activation.

Specific Activator operating modes & parameters can be configured via an Ethernet (wired) interface (not shown). Some configuration settings can also be selected on a PC and sent to the Activator 108 by the Base Station 114 via a 6LoWPAN wireless communication network (wave arrows 3). Other wireless and/or wired communication methods/standards could be used if desired.

Reader

At least one Reader 106 is installed in order to detect the presence of Customers 102 in the Store. Multiple Readers 106 can be installed throughout the Store in order to detect the presence of individual Customers 102 within specific sections of the Store.

A Reader 106 receives and decodes ("reads") the ID 2 transmitted by activated Card(s) that are within its "read range". The effective read zone of a Reader 106 is referred to as a "hotspot". As illustrated in FIG. 1, the read range of a Reader 106 is sufficient to read activated Cards that are physically within individual Store departments 120 (Departments 1, 3, 4, and 5). Readers can be desensitized to restrict the read zone to a specific area, as shown in Department 2. This, for example, allows presence of a Customer 102 within a brand-centric display area to be known so the brand company can send relevant offers to Customers 102 when they are in their display area.

Though not shown, Readers 106 may be positioned near Store entrance areas in order to detect presence of Customers 102 at the earliest opportunity, before they travel to a store department 120. Readers 106 do not communicate information to Cards in one embodiment.

Readers 106 do not communicate with Activators 108 in one embodiment, though it is technically feasible and may have value in some systems.

Readers 106 wirelessly communicate Card read data to the Base Station 114 within the Store 100 via a 6LoWPAN wireless communication network (wave arrows 4). Specific Reader 106 operating modes & parameters can be configured via an Ethernet (wired) interface (not shown). Some configuration settings can also be selected on a PC and sent to the Reader by the Base Station via a 6LoWPAN wireless communication network (wave arrows 3). Other wireless and/or wired communication methods/standards could be used if desired.

Base Station

A single Base Station 114 is typically used in an enabled store. It wirelessly collects data (wave arrows 4) from all Readers 106 installed in the store. The Base Station 114 also sends configuration instructions 3 to Readers 106 and Activators.

Base Stations 114 wirelessly communicate with Readers 106 and Activators 108 within the Store 100 via a 6LoWPAN wireless communication network, as represented by the arrow waves 3 in FIG. 1, Other wireless and/or wired communication methods/standards could be used if desired. Base Stations are also capable of communication via an Ethernet (wired) interface (not shown).

The Base Station 114 does not communicate with Cards in one embodiment.

The Base Station 114 connects via Ethernet to a PC running software for local campaign management at the store level. The PC relays session metrics data via the Internet to the Software Platform 112, which in turn serves offers to Customers 102 and makes this data accessible to participating brand companies and merchants.

Store-Corporate Interface

Figure 2:
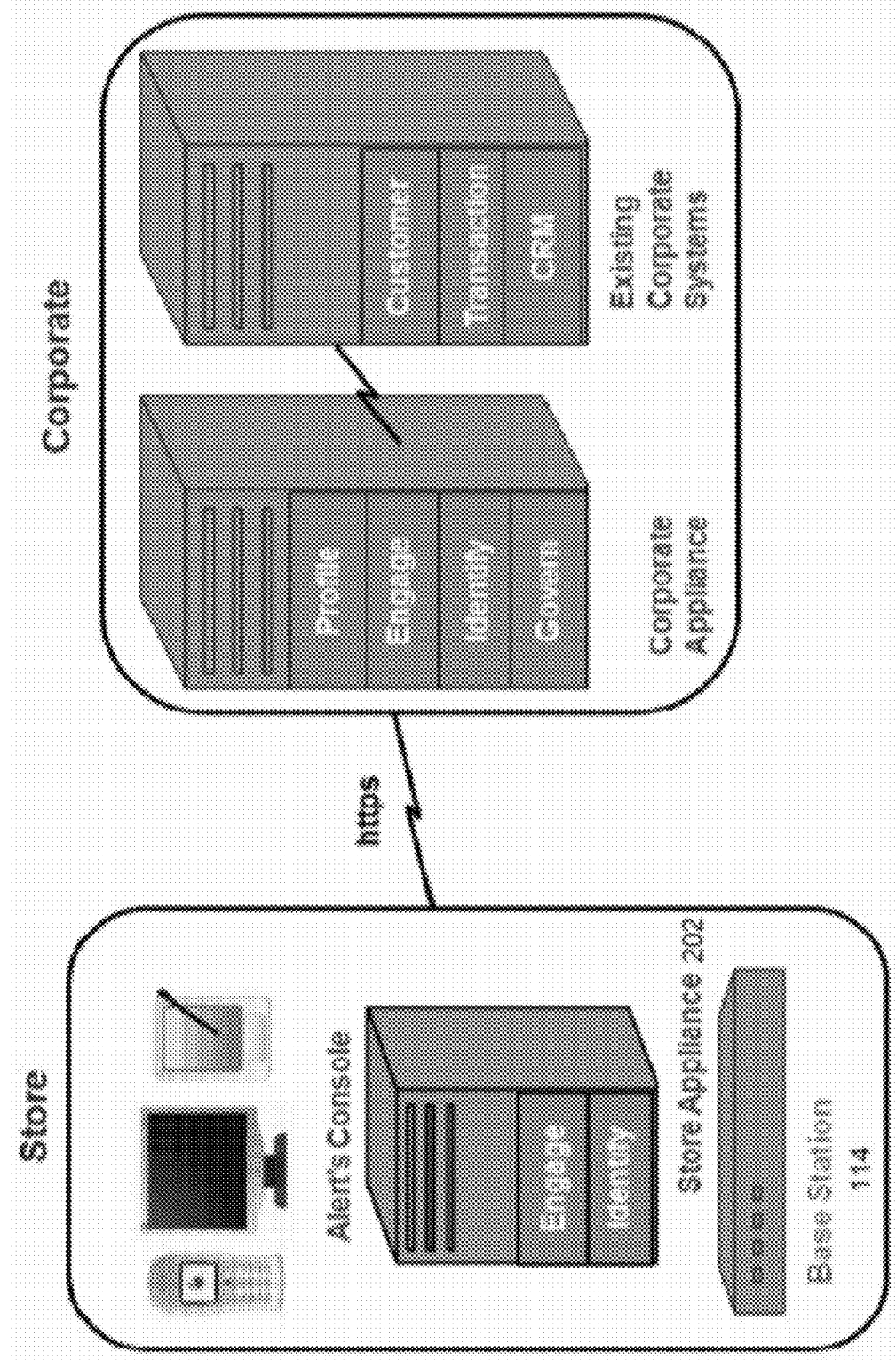
FIG. 2 is a block diagram of a store-corporate application communication system in accordance with one embodiment.

An example of a Store-Corporate Interface is illustrated in FIG. 2. A Store Appliance 202 running a local software application connects to the Base Station 114, and is used to relay session metrics data to servers, which processes the data and makes it available to participating brand companies and merchants. The Store Appliance 202 is also used for Reader 106 and Activator 108 configuration, and provides an interface for store personnel.

The Store Appliance 202 runs the identification and store-engagement applications of the Digital In-Store Ad Network and communicates with the corporate appliance. The in-store session metrics are transferred from the store appliance to the corporate appliance; and the engagement and marketing messages and offers are disseminated from the corporate appliance.

Card

While not actually installed Store hardware, the Card is a hardware element of the System. It is a portable wireless identification device packaged in a credit card form factor that is carried by the Customer 102 to identify them upon entry to a participating Store 100.

The Card contains a sensitive antenna and receiver system designed to selectively detect low frequency RF transmissions from the Activator. When the Card is in the vicinity of the Activator 108 (Store entrance) and detects an activation signal 1, it turns on (activates) and begins transmitting its unique ID 2 at a high RF frequency through a different antenna. The Card periodically re-transmits its unique ID 2 for a finite period of time, which, for example, can approximate the typical time Customers 102 spend in the Store 100. Customer 102 presence within specific Store areas is detected by the hotspot Reader 106 in each area and then communicated to the Software Platform 112 via the Base Station 114 within the Store 100. The Software Platform 112 uses this information to serve timely and relevant offers to the Customer 102 and to collect Customer 102 shopping pattern data ("session metrics"). The Card may be re-activated upon the Customer's next entry into a participating Store 100.

The Card contains a thin battery that powers the receiver and transmitter circuitry to achieve the activation range and read range needed for this application. Special methods are employed in the Card and the System to minimize battery drain, thereby maximizing Card life.

Card communication pathways are wireless only in one embodiment; there is no wired interface. In one embodiment, the Card receives information only from Activators 108, and sends information only to Readers 106. The Card utilizes one data structure and frequency (125 kHz) for the link with Activators, and a different data structure and frequency (433.92 MHz) for the link with Readers. The dual-frequency approach and choice of frequencies facilitate optimal performance for Card activation and for Card reading.

The Card does not communicate with Base Stations in one embodiment.

Operating Frequencies

The Activator 108 transmits a low RF frequency (125 kHz) magnetic field, which can be easily detected by the low-frequency (LF) receiving system of the Card. This frequency was chosen to maximize activation signal detection even when the Card is positioned against the Customer's body or buried in the Customer's purse surrounded by metal objects and fluids (which significantly impact performance at very high frequencies such as UHF (e.g., 900 MHz)).

Card reply transmissions, however, occur at 433.92 MHz—a much higher frequency than the activation signal. This high frequency will carry farther than a low frequency signal will. 433.92 MHz is less sensitive to the attenuating effects of metal or liquid objects positioned near the Card compared to 900 MHz. Furthermore, the battery-powered transmitter in the Card boosts the power of the Card ID transmission to overcome the attenuating effects of any objects that may be in close proximity to the Card, increasing read reliability in the reader network.

The large frequency separation enables performance optimization of receive and transmit functions within the Card without adverse interactions between the two subsystems. Finally, the large frequency separation between Activator 108 transmission and the Reader 106 receive band prevents interference between them—a Reader 106 positioned near an Activator 108 will not be overwhelmed by the Activator 108 transmissions, allowing it to clearly receive Card transmissions.

Reader data is sent to the Base Station 114 at a third carrier frequency of 2.4 GHz, making this communication link immune to Activator and Card transmissions. This same 2.4 GHz radio link is also used by the Base Station 114, Reader 106, and Activator 108 for configuration purposes.

Smartphone Based Presence Identification

In a second embodiment, Consumers use their WiFi-enabled smartphones to register and become customers. In this embodiment, an application is downloaded on the customer's smartphone. The purpose of this application is to capture the signal strength of the WiFi signal received from the various Wireless Access Points installed in the store and send it to the server.

In this embodiment, no activators or readers are installed. Instead the reader network comprises of existing commercially available 802.11 Wireless Access Points. If there are insufficient wireless access points in a store, additional ones can be installed.

Further in this embodiment, the wireless signal strength at many locations inside the store are measured and stored on the server. These are referred to as learnt points.

When a customer with a WiFi-enabled smartphone enters the store, the WiFi signal strength from the various Wireless Access Points is measured by the downloaded application on customer's smartphone and sent to the server. The server compares this to the signal strength of the learnt points, and based on the closest match determines the location of the customer inside the store.

Also, just like in the card-based embodiment a customer's presence in specific departments of a store can determined by learning points in these department. This is the equivalent of creating internal hot-spots by placing a reader in a particular department in the card-based embodiment.

Bluetooth Based Presence Identification

In a third embodiment, consumers use their bluetooth-enabled smartphones to register and become Customers. In this embodiment, an application is downloaded on the customer's smartphone. The purpose of this application is to communicate with Bluetooth transmitters installed at the entrances of the business establishment and in certain sub-sections/departments of the business establishment. The Bluetooth transmitters in turn send the customer's identification information to the server.

Near Field Communications Based Presence Identification

In a fourth embodiment, consumers use NFC-enabled smartcards or mobile phones to register and become Customers. In this embodiment, an application is downloaded on the customer's mobile phone. The purpose of this application is to communicate with NFC readers installed at the entrances of the business establishment and in certain sub-sections/departments of the business establishment. The NFC readers in turn send the customer's identification information to the server. Note, since NFC is a short range communication protocol, typically no more than a few centimeters, the NFC Readers may be installed in a location where it is convenient for the customer to bring her NFC-enabled device in close proximity to the reader.

Digital In-Store Ad Network

Digital In-Store Ad Network System Overview

Figure 3:
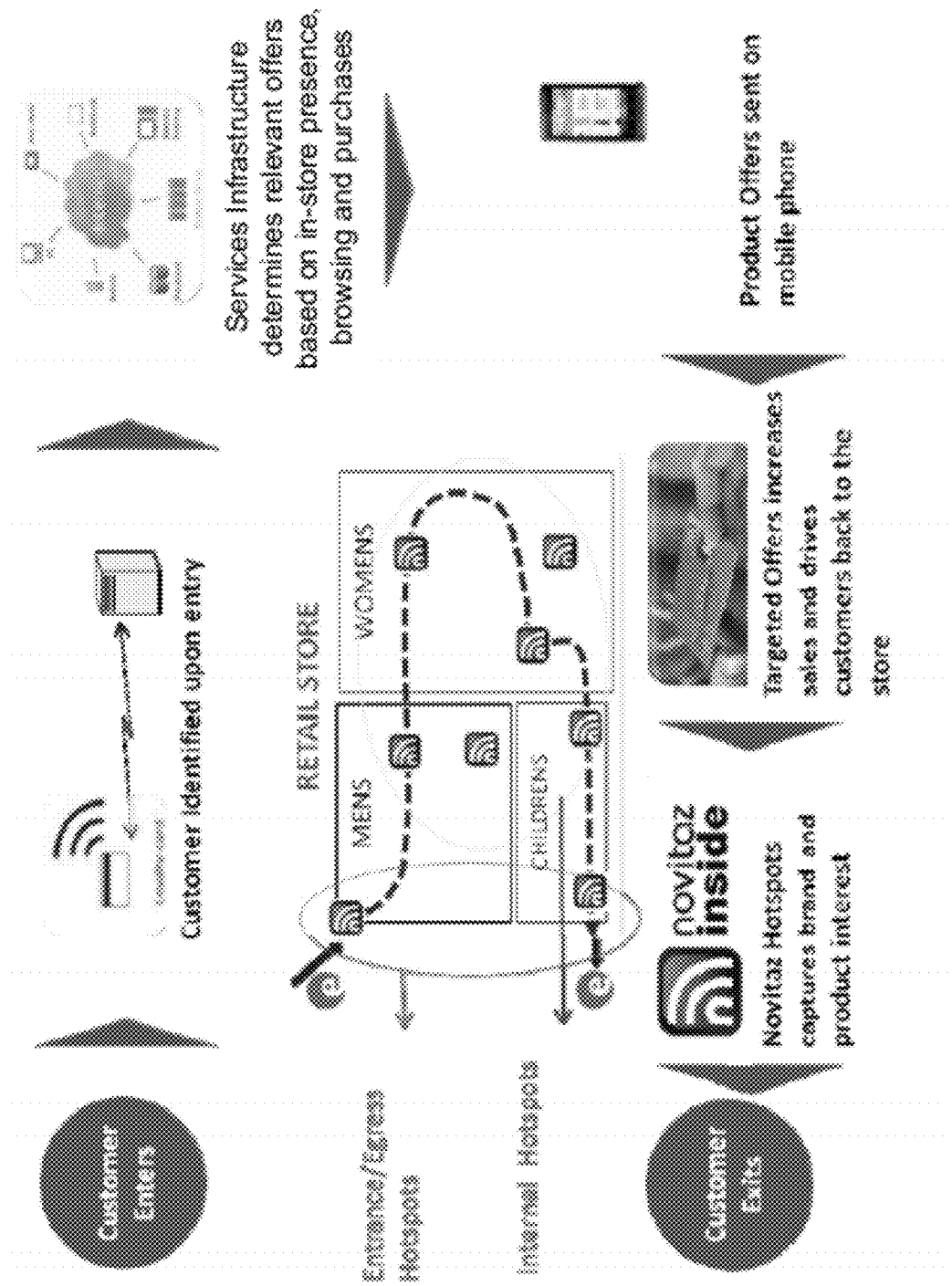
FIG. 3 is a diagram illustrating an overview of a digital in-store ad network sytsem in accordance with one embodiment.

FIG. 3 depicts how the Digital In-Store Ad Network works from an overall system perspective. It shows, at a high level, how a customer's presence is captured upon entry, how the services infrastructure delivers offers to the mobile phone, how the offers result in increased redemption, and how the customers in-store browsing is captured.

Figure 4:
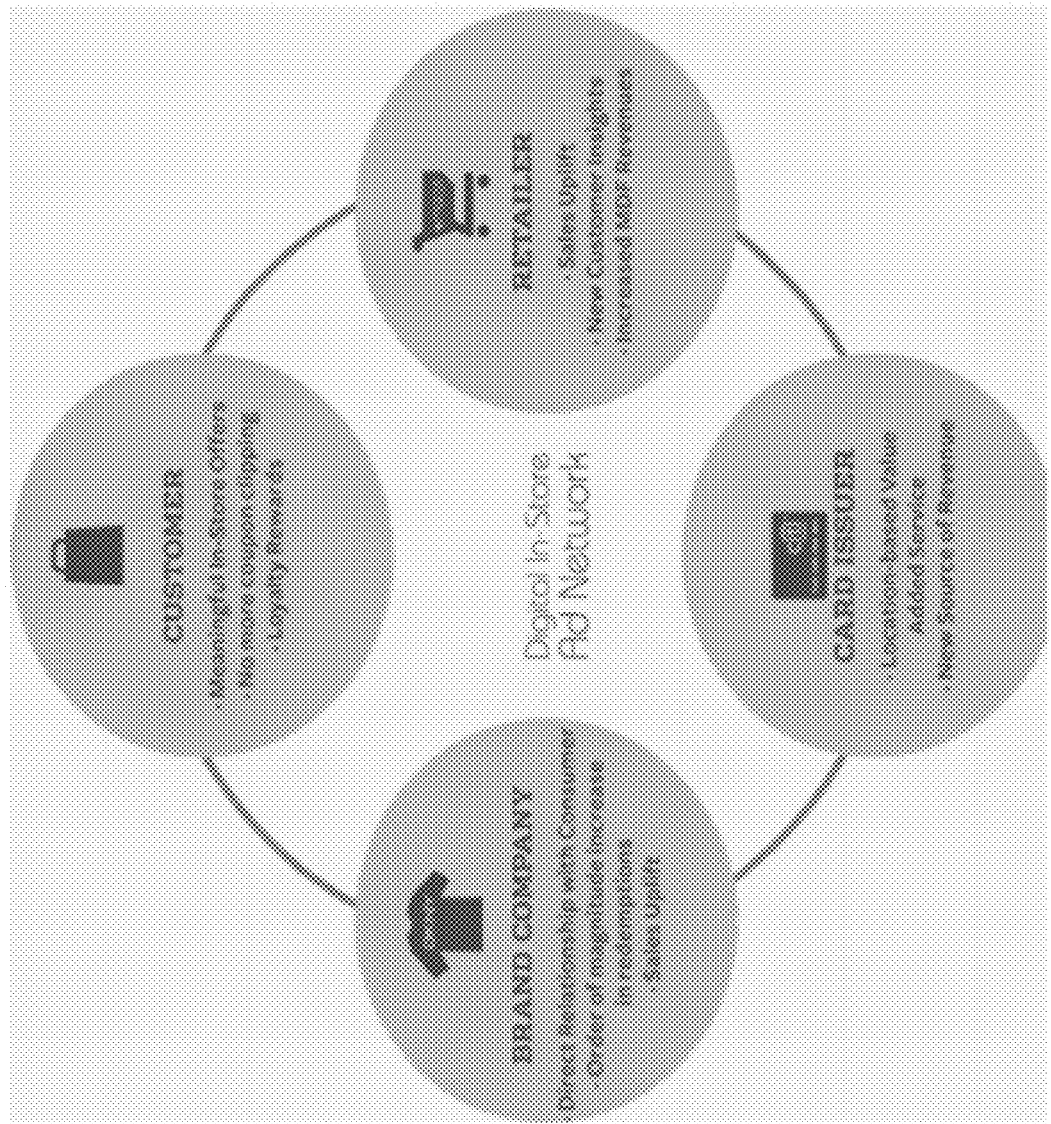
FIG. 4 is a diagram illustrating a digital in-store ad network ecosystem in accordance with one embodiment.

FIG. 4 illustrates an embodiment of a Digital In-Store Ad Network Ecosystem. The Digital In-Store Ad Network ecosystem comprises one or more of the following participants:

Retailer

Advertiser (could be a Retailer, as in the case of a single-branded retailer like GAP; or a brand company, like DKNY, PNG selling its products at a dept/grocery store)

Card Issuer (could be a Credit Card Company, PLCC, loyalty card company)

Digital In-Store Ad Network Campaign Management

In one embodiment, the Digital In-Store Ad Network is offered as a services model. Offers are uploaded by the Advertiser using a web-based campaign management system. As part of the campaign management system, the reach of the offers are defined based on geography and customer segmentation derived from in-store session metrics. From an offer redemption perspective the offer tender type would need to be defined in the retailer POS systems. As an option, the retailers can upload extracts from the transaction log to provide the transaction data of the customers. In these cases further insights such as lost-sales would be derived and this would serve as an additional attribute for customer segmentation.

Digital In-Store Campaign Definition

In-store campaigns are created, stored, scheduled and initiated by the Campaign Management application. Provided as a service by an administrator, and accessed via the internet, the Campaign Manager provides a fully-featured interface for Brand Managers, Merchandisers and In-Store Marketers to run in-store campaigns.

Customer Transaction Data currently captured under loyalty card schemes can be merged with Browsing Data captured by the Digital In-Store Ad Network to create a powerful, all-encompassing view of customer habits and give a more tightly defined customer profile from which the brand manager and merchandizer can define tightly targeted offers.

In one embodiment, a customer profile is captured by the Digital In-Store Ad Network that includes a visit pattern of the customer. In one embodiment, the visit pattern defines the sequence in which a customer browses a merchant's retail store. This includes, for example, the time of entry to the store, the time of entry to departments, time spent in departments, the sequence in which departments are visited, and the time of exit from the store. This information is captured based on the communications between the customer's wireless device and the reader network installed in the business establishment.

Brand Managers have the capability to tightly match offers to a customer's profile, including in-store browsing behavior and the customer's visit pattern to the store which may include information relating to:

Customer's demographic information

Customer purchase information segmented by purchase recency/frequency/value

Customer store visit information segmented by store visit recency/frequency/time spent in store and time spent in departments of the store Uniquely, Brand Managers and Merchandisers can also control other criteria of the offer that is time or location sensitive:

Valid only in this store (the store the customer is in)

Valid only in store in a particular geography (zip code, city, state, region, country)

Valid only for this visit (buy now!)

Valid only for a specified time

Figure 5:
FIG. 5 is a software interface illustrating offer segmentation based on in-store session metrics in accordance with one embodiment.

FIG. 5 illustrates one embodiment of an interface for a Campaign Management application offering richness, convergence and immediacy of data.

Digital In-Store Ad Network Offer Delivery

Offer distribution is comparable to the model of Online Ad Networks. From the point of detecting presence in-store (equivalent to arrival at a landing page), the Digital In-Store Ad Network creates a 'session object' which aggregates and processes loyalty, transaction and in-store browsing data into the most powerful enabling solution for the Brand Manager and Merchandizer.

Offers are delivered by SMS or Rich Messaging to the customer's mobile device, together with a coupon code or 2D (2 Dimensional) Barcode, or QR (Quick Response) code, specific to that offer, redeemable at the checkout. At the same time, offer close rates are captured, facilitating analysis of campaign ROI.

The following 3 steps define the offer delivery to a customer upon entry to a retail store:

Step 1. Customer Enters Store—Ready to Buy

Figure 6:
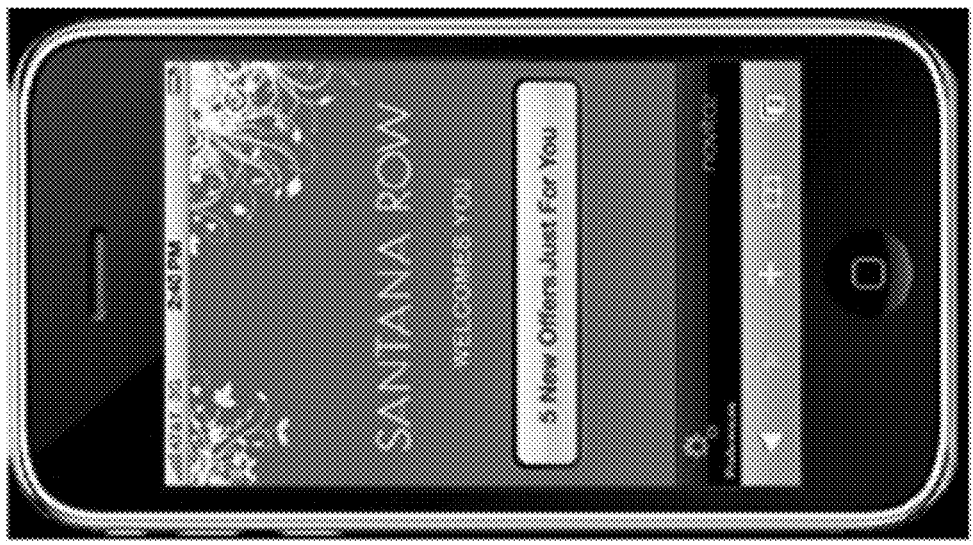
FIG. 6 is a diagram illustrating an example display associated with a customer receiving an offer upon entry to a store in accordance with one embodiment.

At this stage the in-store hardware has detected the customer's presence at the entrance to the store. The Network attempts to generate interest by sending the customer a very personalized message, based on their recent browsing history, (and even with historical online browsing history and purchase history, when this data is appended to in-store browsing data). The customer has opted-in to receive these messages when they registered their wireless device (Active RFID card or smartphone). FIG. 6 illustrates an example screenshot of a display appearing on the customer's mobile device in which the customer receive an offer upon entry to the store.

Step 2. Customer Receives a List of High-Relevance Offers

Figure 7:
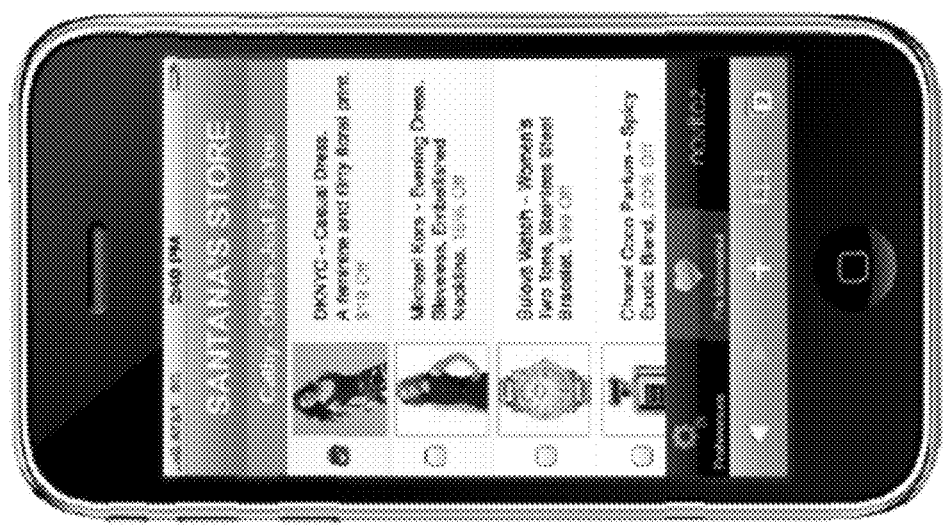
FIG. 7 is a diagram illustrating an example display associated with a list of high relevance offers in accordance with one embodiment.

From their smartphone, the customer receives a selection of offers—a 'menu', from which they choose what they would like to know more about. The Brand company is sent the customers responses, delivering a return on relationship. FIG. 7 illustrates an example screenshot of a display appearing on the customer's mobile device showing a list of high relevance offers for the customer.

Another type of offer a customer can receive is when the customer enters a specific department in the store. This is a department specific offer given to either all customers who enter the department or a segment of customers. These type of offers are classified as the department daily deal of the day, and typically comprises of one deal per department.

Figure 8:
FIG. 8 is a diagram illustrating an example display associated with a deal of the day offer in accordance with one embodiment.

FIG. 8 illustrates an example screenshot of a display appearing on the customer's mobile device showing a deal of the day offer.

Step 3. Customer Clicks on Offers of Interest and Redeems Offer

Figure 9:
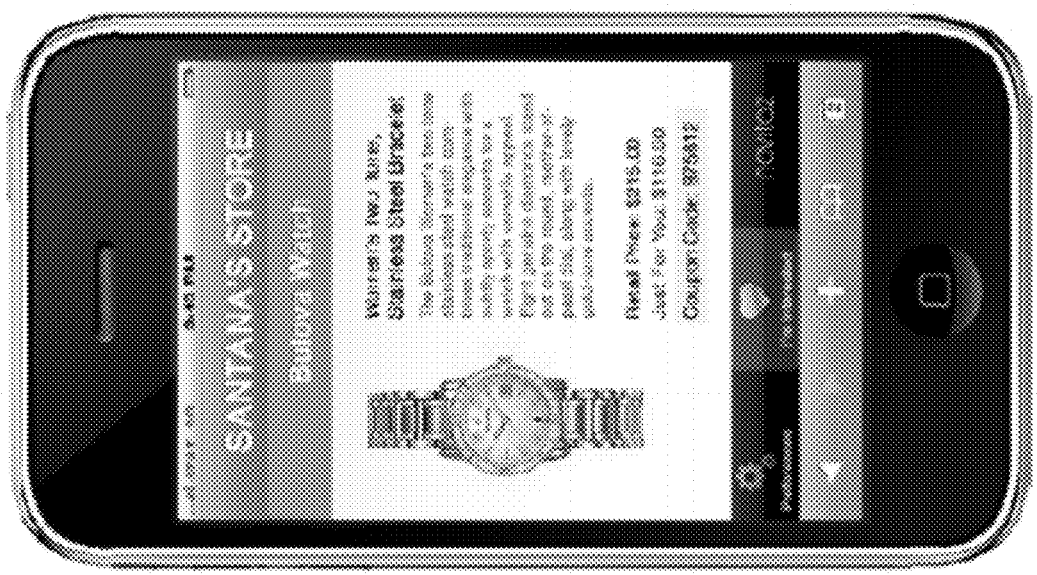
FIG. 9 is a diagram illustrating an example display associated with a customer selecting an offer of interest in accordance with one embodiment.

The customer selects one or more offers of interest. Offers are delivered with a coupon code or 2D Barcode specific to that offer, redeemable at the checkout or pay station. At the same time, offer close rates are captured, facilitating analysis of campaign ROI. FIG. 9 illustrates an example screenshot of a display appearing on the customer's mobile device when the customer selects an offer of interest.

Figure 10:
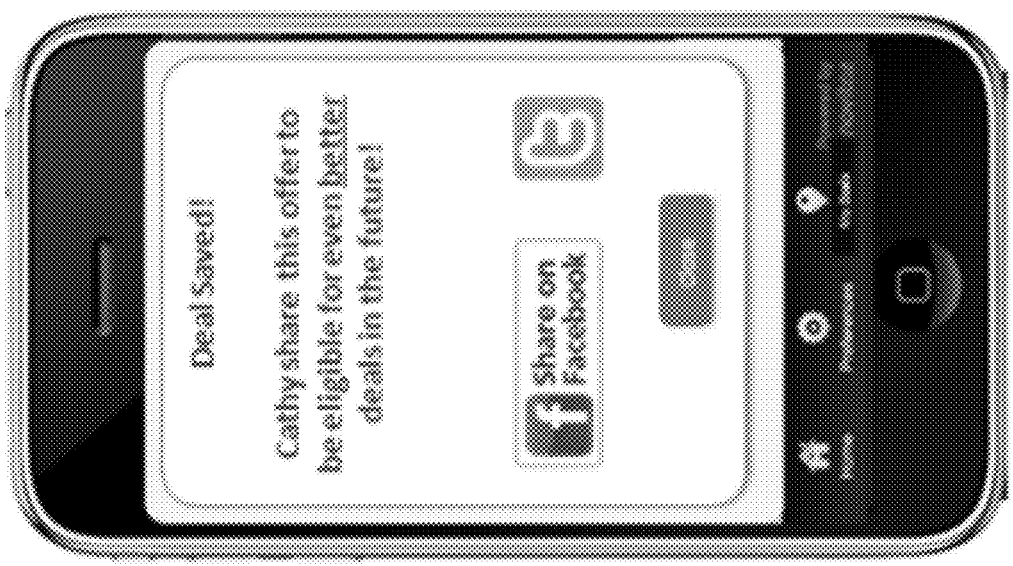
FIG. 10 is a diagram illustrating an example display associated with a customer sharing an offer via a social network in accordance with one embodiment.

At this stage the system allows the customers to share the selected offer with her friends on a social network. For this, the customer will have agreed to allow the system access to her social network. FIG. 10 illustrates an example screenshot of a display appearing on the customer's mobile device when the customer selects to share an offer of interest via a social network.

The offers are redeemed by keying in the promo code, or simply scanning a 2D barcode sent with each offer—the POS captures the sales made from the offers. At this point the Software Platform completes and records the customers entire visit data as Session Metrics.

Step 4. Customer Receives Offer from a Complementary Establishment

Figure 11:
FIG. 11 is a diagram illustrating an example display associated with a customer receiving an offer upon exit in accordance with one embodiment.

The System computes a merchant affinity score—this is a measure of which other neighboring merchants the customer is interested in. For example, the customer could get a complimentary appetizer from a neighboring restaurant which the customer has visited in the past. FIG. 11 illustrates an example screenshot of a display appearing on the customer's mobile device when the customer receives an offer upon exit of the merchant's premises.

Ad Network Monetization

The Advertiser pays for the offers in a performance-based model. This is equivalent to the CPC (Cost Per Click) and CPA (Cost Per Action) models used in online Ad Networks. Different offline cost per clicks models may be used in various embodiments:

Store Entry CPC (Cost Per Click)—Here the advertiser pays when the list of offers are delivered to the customer upon entry to the store, and the customer sees an abbreviated description of the offers as shown in FIG. 7.

Brand Response CPC (Cost Per Click)—Here the advertiser pays when the customer selects one or more offers of interest or shares as shown in FIG. 9.

Viral Marketing CPA (Cost Per Action)—Here the advertiser pays when the customer shares an offer with friends using a social network as shown in FIG. 10.

Offer Redemption CPA (Cost Per Action)—Here the advertiser pays when the customer uses the offer code to redeem an offer.

Campaign Analysis

Figure 12:
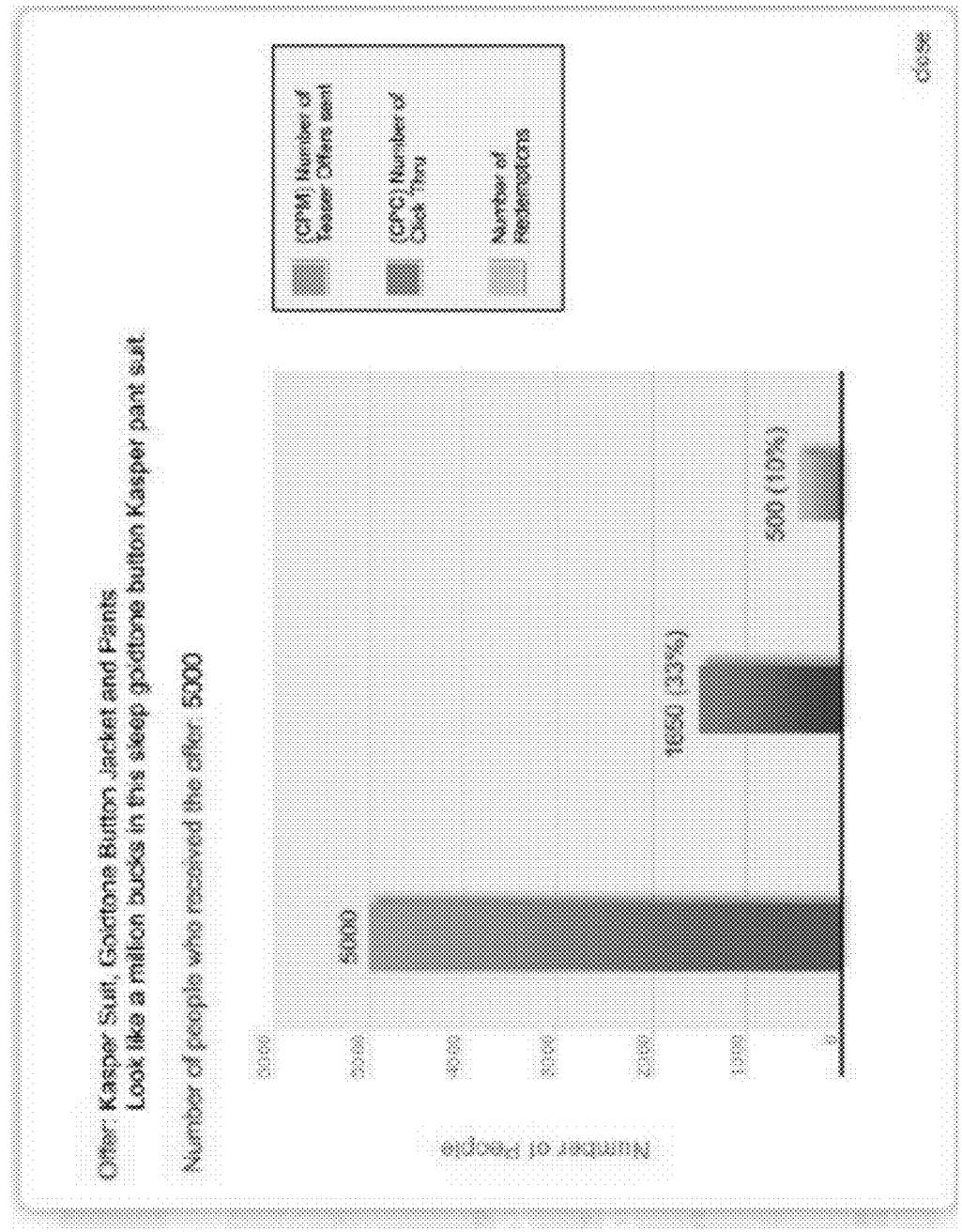
FIG. 12 is a chart illustrating a campaign response in accordance with one embodiment.

By uploading session data (and, if required, sales data), to an analytic software (e.g., Google Analytics), the same analysis tools for on-line and in-store browsing, actions, and sales data can be used, including determining ROI on a per-offer basis. FIG. 12 illustrates an example chart showing analytical data from an exemplary campaign response.

Various embodiments described above may be implemented using computer program modules, applications, or software for providing functionality described herein. In such implementations, computer program instructions and/or other logic are used to provide the specified functionality. Thus, a module or application can be implemented in hardware, firmware, and/or software. In one embodiment, program modules or applications formed of executable computer program instructions are stored in a non-transitory computer-readable storage medium, loaded into a memory, and executed by one or more processors to carry out the functions described herein.

The present invention has been described in particular detail with respect to a limited number of embodiments. Those of skill in the art will appreciate that the invention may additionally be practiced in other embodiments. The system may be implemented via a different combination of hardware and software from that described. Also, the particular division of functionality between the various system components described herein is merely exemplary, and not mandatory; functions performed by a single system component may instead be performed by multiple components, and functions performed by multiple components may instead be performed by a single component.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method for marketing in a retail store directly to a customer in possession of a wireless device having a unique ID, wherein the wireless device comprises an active RFID card, wherein the customer repeatedly visits the retail store, the method comprising steps of:
   repeatedly transmitting, by one or more activators each positioned at an entrance/egress of the store, an activation signal in a plurality of different directions to activate the wireless device entering the store to start communicating its unique ID, where the activation signal is transmitted by the activators at a first radio frequency, and the unique ID communicated by the wireless device is transmitted at a second radio frequency that is higher than the first radio frequency;
   detecting, by at least one of a plurality of readers distributed throughout the store, the transmitted unique ID and informing a server of times that the wireless device carried by the customer performed one or more of the following: (i) entered and/or re-entered the retail store, (ii) moved to and spent at various locations within the retail store, and (iii) exited the retail store;
   determining, by the server, a visit pattern of the customer during a time period when the customer was in the retail store, the visit pattern corresponding to a physical and sequential browsing behavior of the customer within the retail store during the time period and identifying sections of the retail store where the customer spent time;
   generating and storing, by the server, a marketing message for a future delivery to the wireless device of the customer, wherein content of the marketing message is based at least on the visit pattern; and
   communicating, by the server after the wireless device of the customer has re-entered the retail store, the marketing message to the wireless device of the customer while the customer remains present in the retail store.

2. The method of claim 1, wherein the readers and activators include at least one wireless active radio frequency identification (RFID) activator and at least one wireless reader.

3. The method of claim 1, wherein the step of generating a marketing message comprises a step of: receiving, by the server, information relating to a campaign uploaded to the server by an advertiser via a web-based campaign management interface accessible to the advertiser.

4. The method of claim 3, further comprising a step of: receiving, the server, from the advertiser, via the web-based campaign management interface, selections of offers or incentives for inclusion in the campaign.

5. The method of claim 3, wherein the web-based campaign management interface further enables the advertiser to segment offers based on one or more of demography of the customer, transaction information for the customer, and the visit pattern.

6. The method of claim 3, wherein the web-based campaign management interface further enables the advertiser to define validity limitations for offers, the offers including at least one of: an offer valid only for a current visit to the retail store, an offer valid only in the retail store, and an offer valid only for a particular duration of time.

7. The method of claim 3, further comprising a step of: charging the advertiser a fee based on a response of the customer to the campaign.

8. The method of claim 3, wherein the web-based campaign management interface includes rules to determine relevance of offers based on a response to the campaign by the customer and the visit pattern.

9. The method of claim 3, further comprising a step of: providing, by the server, a report to the advertiser based on a response to the campaign.

10. The method of claim 3, further comprising a step of: providing, by the server, a report to the retail store, the report including visit patterns of a segment of customers.

11. The method of claim 1, wherein the step of communicating comprises a step of: communicating the marketing message to the wireless device of the customer responsive to receiving the data indicating that the wireless device of the customer has re-entered the retail store.

12. The method of claim 1, wherein the step of communicating comprises a step of: communicating a department-specific offer responsive to detecting when the wireless device of the customer has entered a specific department within the retail store.

13. The method of claim 1, wherein the marketing message includes a menu or list of offers providing an abbreviated description of each offer.

14. The method of claim 13, further comprising a step of: receiving, by the server, a selection from the customer of one or more offers from the list of offers.

15. The method of claim 14, further comprising a step of: storing, by the server, the selection as an indication of interest by the customer in one or more products or brands described in the one or more offers selected by the customer.

16. The method of claim 1, further comprising steps of: receiving, by the server, information pertaining to social network information of the customer.

17. The method of claim 1, further comprising a step of: redeeming, by the server, an offer provided to the wireless device of the customer upon selection of the offer by the customer at a point of sale.

18. The method of claim 1, further comprising a step of: providing, by the server, an offer to the customer responsive to detecting that the wireless device of the customer exited the retail store.

19. The method of claim 18, wherein the offer is associated with a merchant in close geographic proximity to the retail store.

20. A non-transitory, computer-readable storage medium storing computer-executable program instructions, which when executed by a processor perform a method for in store marketing in a retail store directly to a customer in possession of a wireless device having a unique ID, wherein the wireless device comprises an active RFID card, wherein the customer repeatedly visits the physically-constructed retail store, the method comprising steps of:
repeatedly transmitting, by one or more activators each positioned at an entrance/egress of the store, an activation signal in a plurality of different directions to activate the wireless device entering the store to start communicating, its unique ID, where the activation signal is transmitted by the activators at a first radio frequency, and the unique ID communicated by the wireless device is transmitted at a second radio frequency that is higher than the first radio frequency;
detecting, by at least one of a plurality of readers distributed throughout the store, the transmitted unique ID and informing a server of times that the wireless device carried by the customer performed one or more of the following: (i) entered and/or re-entered the retail store, (ii) moved to and spent at various locations within the retail store, and (iii) exited the retail store;
determining, by the server, a visit pattern of the customer during a time period when the customer was in the retail store, the visit pattern corresponding to a physical and sequential browsing behavior of the customer within the retail store during the time period and identifying sections of the retail store where the customer spent time;
generating and storing, by the server, a marketing message for a future delivery to the wireless device of the customer, wherein content of the marketing message is based at least on the visit pattern; and
communicating, by the server after the wireless device of the customer has re-entered the retail store, the marketing message to the wireless device of the customer while the customer remains present in the retail store.

* * * * *